United States Patent [19]

Kume

[11] Patent Number: 4,919,002
[45] Date of Patent: Apr. 24, 1990

[54] STEPLESS SPEED CHANGE APPARATUS
[75] Inventor: Takeshi Kume, Amagasaki, Japan
[73] Assignee: T.K.M. Engineering Kabushiki Kaisha, Amagasaki, Japan
[21] Appl. No.: 313,747
[22] Filed: Feb. 22, 1989
[30] Foreign Application Priority Data
  Feb. 23, 1988 [JP] Japan .................................. 63-41610
  Aug. 31, 1988 [JP] Japan ................................ 63-219499
[51] Int. Cl.$^5$ ............................................. F16H 15/08
[52] U.S. Cl. ......................................... 74/199; 74/190
[58] Field of Search ................... 74/796, 190, 199, 212
[56] References Cited
  FOREIGN PATENT DOCUMENTS
    154003  9/1904  Fed. Rep. of Germany .
    1650674 2/1970  Fed. Rep. of Germany .
    462719  2/1914  France .
    489404  2/1919  France .
    524154  8/1921  France .

Primary Examiner—Dwight G. Diehl
Assistant Examiner—Knui Q. Ta
Attorney, Agent, or Firm—Marshall, O'Toole, Gerstein, Murray & Bicknell

[57] ABSTRACT

A stepless speed change apparatus includes first and second parallel shafts, each carrying a plurality of discs disposed in succession along the shaft, the discs on the first shaft have progressively increasing diameters along one axial direction and the discs on the second shaft have progressively decreasing diameters in that direction, an intermediate shaft is disposed at an angle to a plane containing the axes of the first and second shafts, the intermediate shaft carries intermediate discs each of which is aligned radially with one of the discs on the first shaft and one of the discs on the second shaft, the intermediate shaft can be shifted in a direction perpendicular to the plane containing the axes of the first and second shafts so that as the intermediate shaft is moved the intermediate discs are, in turn, brought into engagement with respective pairs of discs on the first and second shafts at peripheral portions of the discs.

7 Claims, 5 Drawing Sheets

4,919,002

STEPLESS SPEED CHANGE APPARATUS

The present invention relates to a stepless speed change apparatus for use in automobiles and various machines.

BACKGROUND OF THE INVENTION

Various types of mechanical stepless speed change apparatus have been provided. Automobiles, which are a typical machine requiring frequent speed change, have been provided with a so-called Van Dona type stepless speed change apparatus which combines steel belts and segment pieces to transmit rotary force between variable-gap V-pulleys, and a second type of stepless speed change apparatus which provides a stepless speed change in the bypass circuit of a differential gear mechanism.

Automobiles are often driven under severe conditions such as quick start and quick acceleration. As a result, the life of the power transmission system tends to be reduced.

In the case of the Van Dona type apparatus, the steel belts tend to have a short life. Furthermore, when a compact design is required, the highest output of the apparatus is generally said to be limited to about 100 horsepower.

In the case of the second type of apparatus, if the conventional stepless speed change device is used with friction wheels, it is also difficult to develop large horsepower because of the small area of frictional engagement.

SUMMARY OF THE INVENTION

An object of this invention is to provide a stepless speed change apparatus which is rugged, simple and compact in structure, quick in speed change, and excellent in power transmission efficiency.

An apparatus according to a preferred embodiment of the invention comprises a frame, first and second parallel shafts journaled on said frame, a plurality of first disc means mounted on said first shaft so as to rotate therewith, a plurality of second disc means mounted on said second shaft so as to rotate therewith, said first and second disc means having diameters increasing axially in opposite directions to each other, an intermediate shaft supported on said frame between said parallel shafts at angles in the third dimension to said parallel shafts, said intermediate shaft being adapted to shift, with said angles fixed, perpendicularly to the plane containing the axes of said parallel shafts, and a plurality of intermediate disc means of the same diameter mounted rotatably on said intermediate shaft with their axes parallel to said parallel shafts, each of said intermediate disc means being aligned radially with one of said first disc means and one of said second disc means, whereby any one of said intermediate disc means can, depending on the position of said intermediate shaft, engage with the aligned first and second disc means at their peripheries.

BRIEF DESCRIPTION OF THE DRAWING

A preferred embodiment of this invention is illustrated by the drawings, wherein.

DETAILED DESCRIPTION OF THE DRAWINGS

Figure 1:
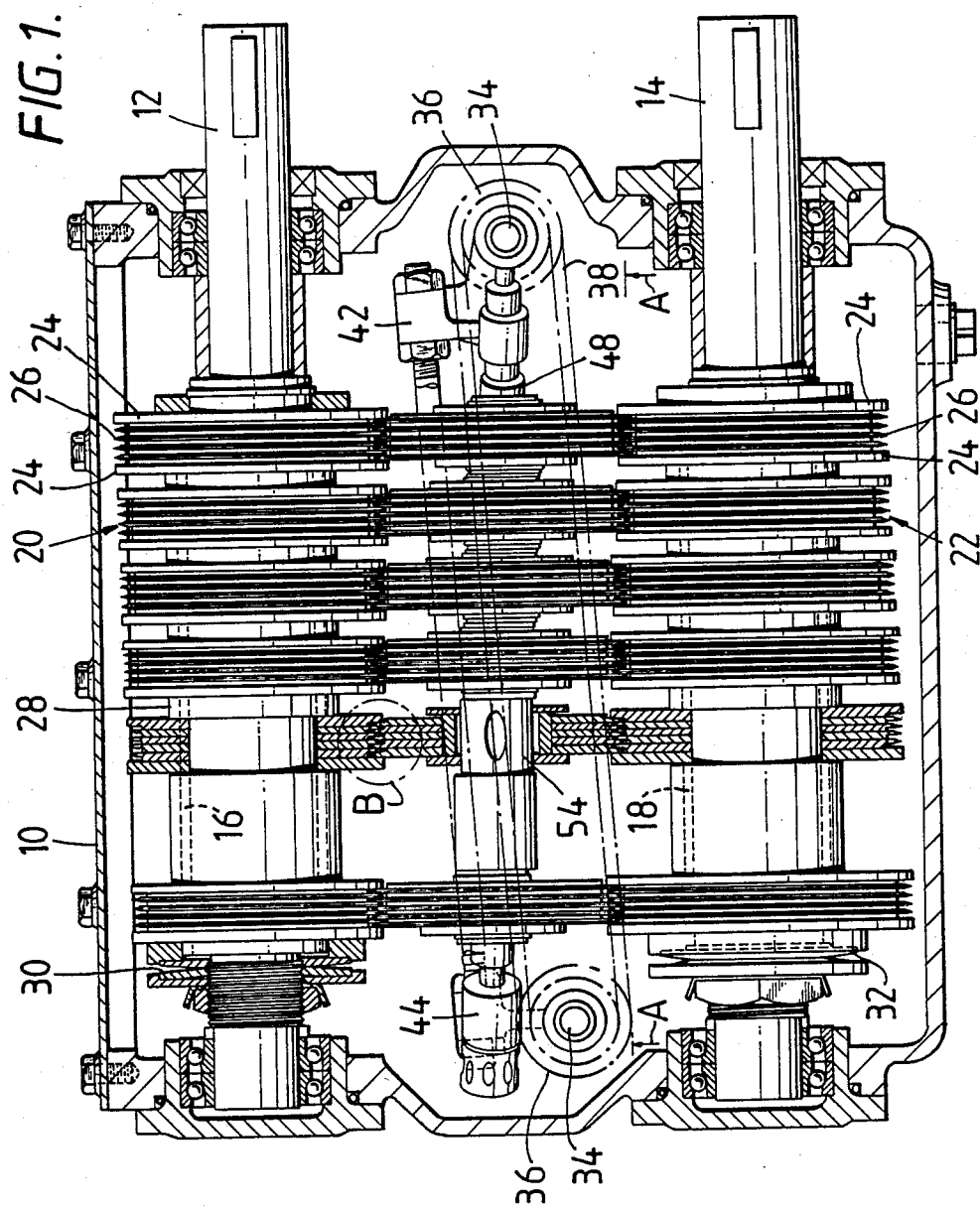
FIG. 1 is a side elevational view, partially in section, of a speed change apparatus according to the invention.

With reference to FIG. 1, the apparatus includes a casing 10. On the casing are journaled an input shaft 12 and an output shaft 14 which extend horizontally in parallel to each other. The shafts 12 and 14 are formed with splines 16 and 18. On each shaft 12, 14 are mounted the same number of disc assemblies 20, 22.

Each disc assembly 20 on the input shaft 12 includes two outer discs 24 and four, for example, inner discs 26 between the outer discs. The outer and inner discs 24, 26 of each assembly 20 have the same diameter. The diameters of assemblies 20 increase slightly and stepwise to the right in FIG. 1.

The splines 16 of the input shaft engage with the outer and inner discs 24 and 26, and with spacer rings 28 interposed between adjacent disc assemblies 20. On the input shaft 12 are mounted belleville springs 30 adjacent its left end to urge all discs 24 and 26 to the right.

The disc assemblies 22 on the output shaft 14 are substantially the same as the assemblies 20 on the input shaft, but they have diameters decreasing slightly and stepwise to the right. The assemblies 22 similarly engage with the splines 18 of the output shaft, and they are urged to the right by belleville springs 32 mounted on the output shaft.

Figure 2:
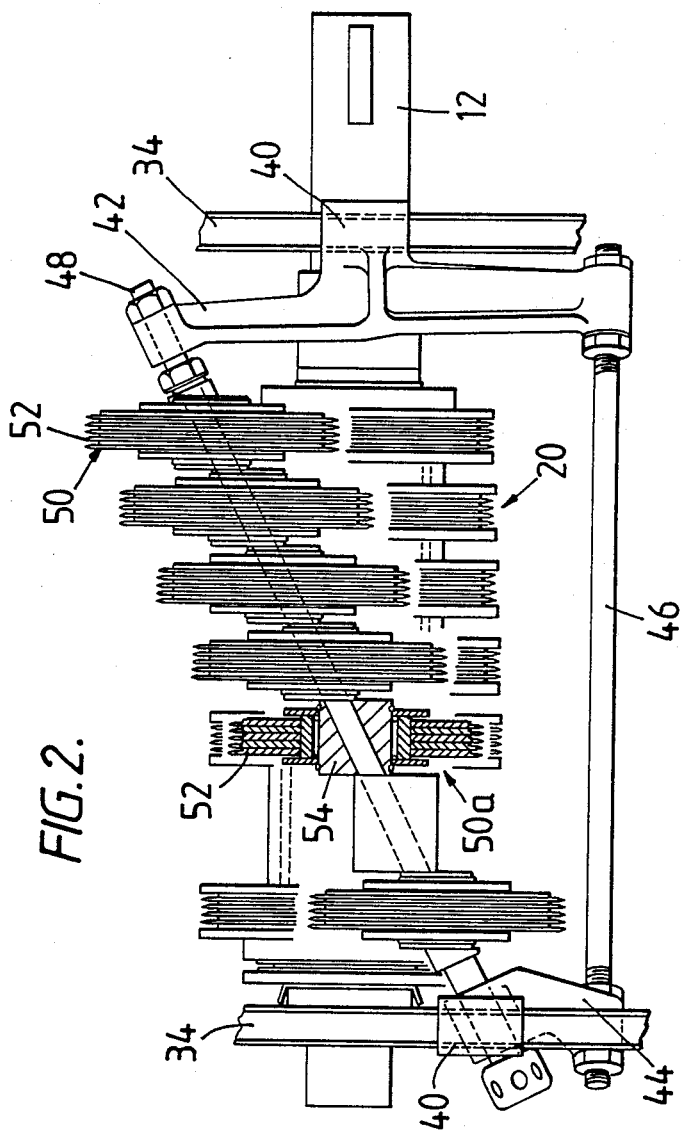
FIG. 2 is a sectional view taken along line A—A of FIG. 1.

With reference to FIGS. 1 and 2, two horizontal and parallel screw or threaded shafts 34 are journaled on the casing 10 and extend between the input and output shafts 12 and 14 perpendicularly to the vertical plane containing the axes of these shafts 12 and 14. The screw or threaded shafts 34 have chain sprockets 36, which can be driven through a chain 38 by power transmission means (not shown) to rotate the screw shafts 34 in the same direction.

Each screw shaft 34 engages with a threaded portion 40 of a coupling member 42,44. The coupling members 42 and 44 are bridged by a connecting rod 46, and support an intermediate shaft 48 fixed thereto at an angle to that vertical plane as shown in FIG. 2, and a slight angle to a horizontal plane as shown in FIG. 1. Thus, the rotation of screw shafts 34 shifts the intermediate shaft 48 at the constant angle and perpendicularly to that vertical plane.

The intermediate shaft 48 carries the same number of disc assemblies 50 as the assemblies 20, 22. The assemblies 50 all have the same diameter, and each includes five discs 52 of the same diameter supported rotatably around a hub 54 and axially slightly loosely. The hubs 54 are fixed to the shaft 48 with their axes in parallel to the input and output shafts 12 and 14, so that all disc assemblies 20, 22 and 50 are parallel to each other, and each assembly 50 is substantially aligned radially with one assembly 20 and one assembly 22.

Figure 3:
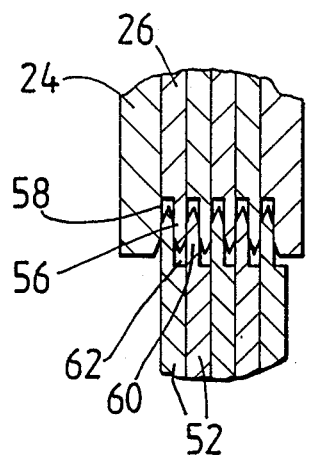
FIG. 3 is an enlarged view of the portion B in the circled dashed line in FIG. 1.

As best shown in FIG. 3, each inner disc 26 on the input and output shafts has a thinned outer peripheral portion 56 with a tapered edge. Peripheral grooves 58 are formed between each outer disc 24 and adjacent inner disc 26 and between adjacent inner discs, when they contact each other. Similarly, each disc 52 on the intermediate shaft 48 has a thinned outer peripheral portion 60 with a tapered edge. Peripheral grooves 62 are formed between adjacent discs 52 when they contact each other.

The discs 26 and 52 may have the same thickness, with their peripheral portions 56 and 60 having a thickness slightly more than half the thickness of discs 26 and 52. When each disc assembly 50 comes between the associated assemblies 20 and 22, the peripheral portions 60 and 56 engage each other compressively by the action of springs 30 and 32.

The operation is explained below with reference to FIGS. 4a-c as viewed in the axial direction of all disc assemblies.

Figure 4:
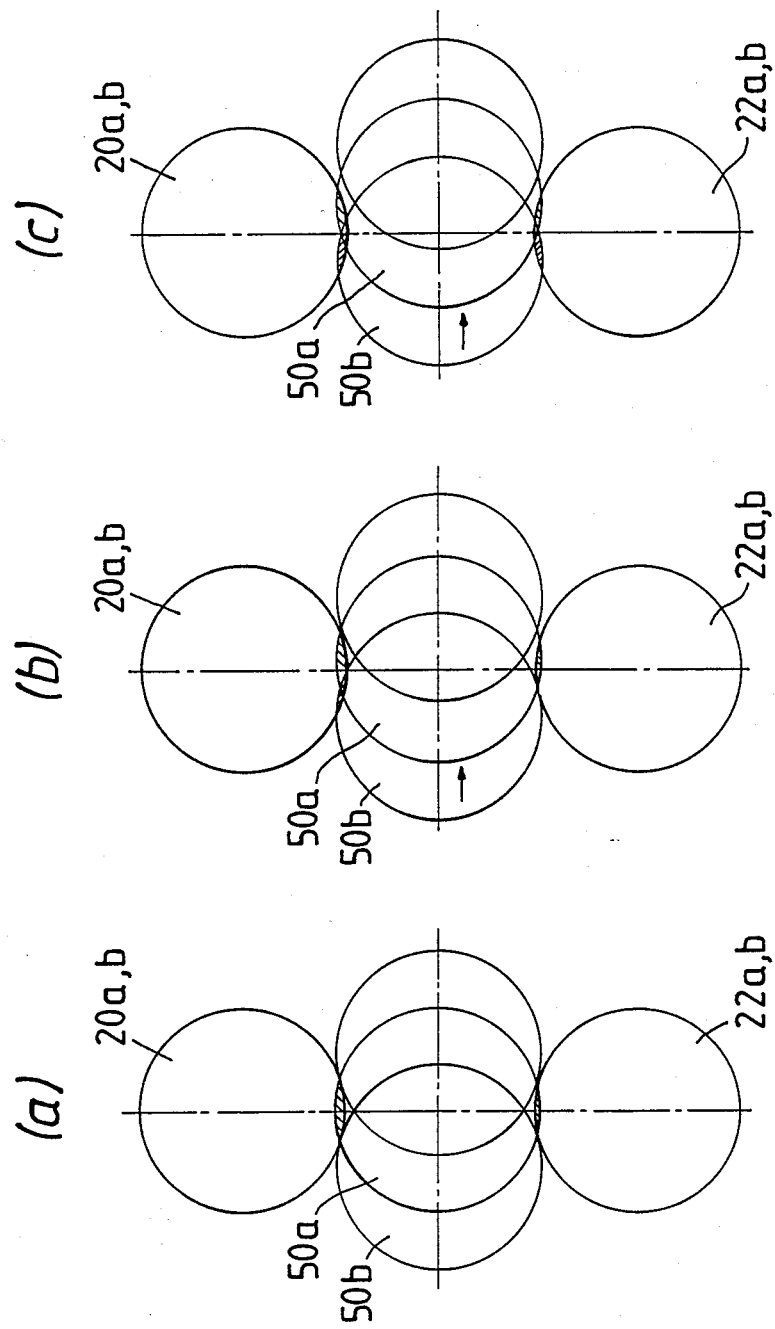
FIGS. 4 a-c are diagrams illustrating changes of engagement between the disc assemblies shown in FIGS. 1 to 3.

In FIG. 4a, one disc assembly 50a on the intermediate shaft 48 (FIG. 2) is diametrically aligned with both associated assemblies 20a and 22a on the input and output shafts, with their maximum area of engagement, while no other disc assemblies engage.

In FIG. 4b, as the intermediate shaft shifts to the right, the engagement area between the disc assemblies 20a, 22a and 50a gradually decreases, while the succeeding assembly 50b starts to engage with the associated assemblies 20b and 22b, which differ in diameter from the assemblies 20a and 22a respectively.

In FIG. 4c, as the intermediate shaft further shifts to the right, the engagement area between the disc assemblies 20a, 22a and 50a further decreases while that between the assemblies 20b, 22b and 50b increases.

Thus, the rotation of the input shaft is transmitted through the intermediate shaft to the output shaft at an increased or reduced speed depending on which disc assemblies engage. This apparatus can effect substantially stepless speed change, because of a continuous change between two modes of engagement, which are the maximum engagement between one set of radially aligned disc assemblies and partial engagement between an adjacent set.

Figure 5:
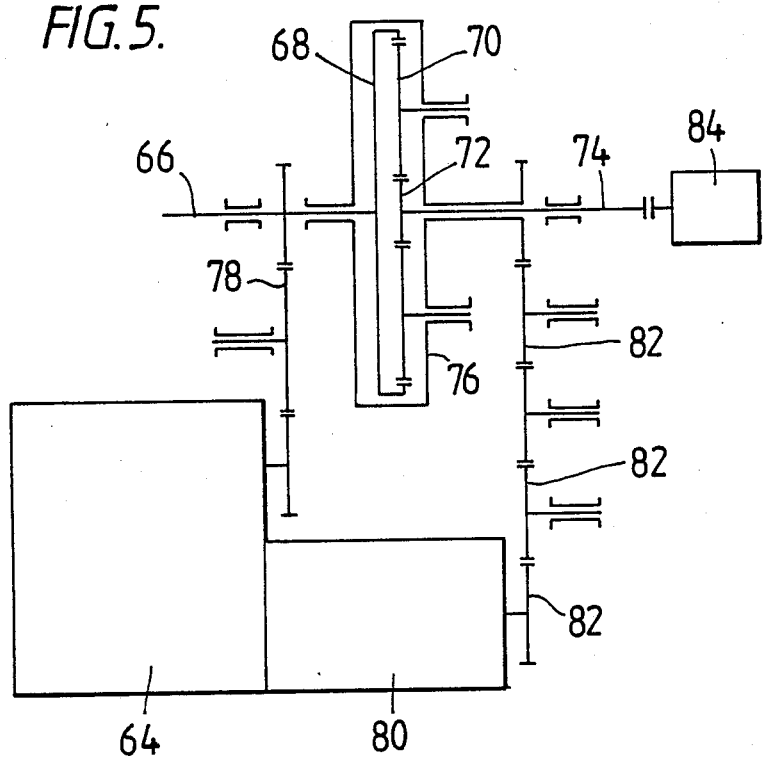
FIG. 5 illustrates an arrangement wherein the apparatus of this invention is combined with a differential gear mechanism.

FIG. 5 shows a differential gear in combination with a stepless speed change apparatus 64 according to this invention.

In FIG. 5, a portion of rotary torque of an input shaft 66 is transmitted through a ring gear 68, planetary gears 70 and a sun gear 72 to an output shaft 74. The other portion of torque is transmitted via a gear 78, the apparatus 64, a claw clutch 80 with synchronizing mechanism and a plurality of gears 82 which bypass the differential gear mechanism, to a carrier 76 to which the planetary gears 70 are journaled.

Figure 6:
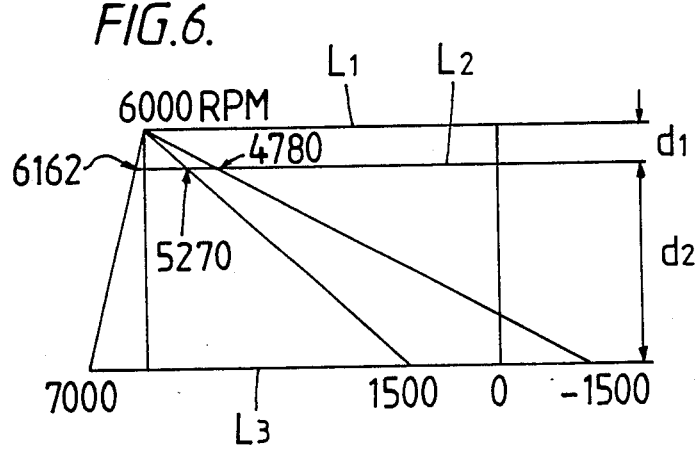
FIG. 6 illustrates diagrammatically the number of revolutions of various parts of the differential gear mechanism shown in FIG. 5.

FIG. 6 shows an example of the numbers of revolutions of various parts of the differential gear mechanism of FIG. 5. The P.C.D. (pitch diameter) of each gear is proportional to the number of teeth. In FIG. 6, d1 and d2 represent the ratio of P.C.Ds. of sun gear 72 and ring gear 68 when the sun gear has 26 teeth and the ring gear has 134 teeth. The number of revolutions is also proportional to the pitch diameter (number of teeth), and straight lines L1, L2 and L3 indicate the number of revolutions (RPM) of the input shaft, carrier and output shaft, respectively. If the number of revolutions of the input shaft is 6,000 RPM, the number of revolutions of the output shaft at overdrive is 7,000 RPM, the number of revolutions at the start and low speed is reduced to one quarter (1,500 RPM), and the number of revolutions in reverse gear is also reduced to one quarter (1,500 RPM), the corresponding range of number of revolutions of the carrier will be determined by the crossing points of the line L2 and the lines connecting the point at 6,000 on the line L1 and the points at 7,000 and −1,500 on the line L3; from 4,780 to 6,162 RPM. Furthermore, the line connecting the point at 1,500 on the line L3 and the point at 6,000 on the line L1 and the line L2 cross with each other to give 5,270 RPM. As a result, the range of number of revolutions of the carrier from the start and low speed up to the overdrive is from 5,270 to 6,162 RPM. As the speed change apparatus of this invention operates within this range, a wide range of stepless speed changes will be achieved.

If a high-performance torque sensor 84 is used in combination, because the torque will be highest when the brake is actuated, no clutch will be needed by arranging the speed change apparatus to quickly come to a stop by a signal from the torque sensor.

The engagement area is an important factor for determining the magnitude of the transmitable torque. As the present invention uses a system wherein flanges of discs are pressed to engage each other to transmit rotating toque, the engagement area may be increased with ease by simply increasing the number of discs.

The input and output shafts are provided with belleville springs, which generate a compressive force engagement. The simple construction can reliably transmit rotary torque.

As the outer diameters of the disc assemblies on the input and output shafts vary slightly, the engagement areas hardly generate heat or wear due to slippage. As the rotating force is transmitted with the engagement areas being continuously variable, smooth stepless speed change is accomplished without using a clutch.

In the preferred arrangement described above, the disc assemblies 20 have differing diameters, and also the disc assemblies 22 have differing diameters. However, this is not essential; instead, one set of disc assemblies 20 or 22 could have constant diameters. In this case, the first and second shafts would not be parallel, although they would have axes lying in the same plane. If desired, the disc assemblies 50 on the intermediate shaft could have differing diameters, such that the diameters of the assemblies on the intermediate shaft increase stepwise in an axial direction along the intermediate shaft, the diameters of the assemblies on one of the shafts 12 and 14 increasing stepwise in the opposite sense. A further alternative would be to arrange for the diameters of both sets of disc assemblies 20 and 22 to be constant, with the assemblies 50 on the intermediate shaft having differing diameters.

What is claimed is:

1. A stepless speed change apparatus comprising:
 a frame;
 first and second parallel shafts journaled on said frame;
 a plurality of first disc means mounted on said first shaft so as to rotate therewith;
 a plurality of second disc means mounted on said second shaft so as to rotate therewith;
 said first and second disc means having diameters increasing axially in the opposite directions to each other;
 an intermediate shaft supported on said frame between said parallel shafts at an angle to a plane containing the axes of the parallel shafts, said intermediate shaft being adapted to shift in a direction transverse to said plane;

a plurality of intermediate disc means of the same diameter, which are mounted rotatably on said intermediate shaft with their axes in parallel to said parallel shafts, each of said intermediate disc means being aligned radially with one of said first disc means and one of said second disc means; and whereby any one of said intermediate disc means can, depending on the position of said intermediate shaft, engage with the aligned first and second disc means at their peripheries.

2. The apparatus of claim 1, wherein each of the first and second disc means comprises at least two discs of the same diameter which are mounted slidably on the first and second shafts respectively;

said apparatus further comprising spring means mounted on one end of each of the first and second shafts to urge the two discs axially toward the other end;

each of the intermediate disc means comprising at least one intermediate disc;

each of the discs having a thinned outer peripheral portion with a tapered edge;

the peripheries of the two discs forming a peripheral groove, which is axially slightly narrower than the thickness of the periphery of the intermediate disc, when the two discs contact each other; and the periphery of the intermediate disc being adapted to compressively engage with said groove.

3. The apparatus of claim 2, further comprising:

a plurality of hubs fixed to the intermediate shaft, each of the hubs having an axis in parallel to the first and second shafts and supporting one of the intermediate disc means rotatably thereon;

a pair of parallel screw shafts journaled on the frame and extending perpendicularly to the plane containing the axes of the first and second shafts;

drive means connected to the screw shafts to rotate them; and a pair of coupling means, each fixed to one end of the intermediate shaft, and each engaging with one of the screw shafts so as to shift the intermediate shaft when the screw shafts rotate.

4. The apparatus of claim 1, wherein the intermediate shaft is supported at an angle to each of the first and second shafts.

5. The apparatus of claim 4, wherein the intermediate shaft is adapted to move in a direction perpendieular to said plane in such a manner as to maintain said angles constant.

6. The apparatus of claim 1, wherein the intermediate shaft has a position wherein adjacent intermediate disc means engage with respective aligned pairs of first and second disc means.

7. A stepless speed change apparatus comprising:

first and second shafts disposed substantially within a common plane;

an intermediate shaft disposed at an angle to the plane;

a plurality of first discs means carried by the first shaft;

a plurality of second disc means carried by the second shaft;

a plurality of intermediate disc means carried by the intermediate shaft;

the intermediate shaft being movable in a direction transverse to the plane so as to bring each of the intermediate disc means in turn into engagement simultaneously with a respective one of the first disc means and a respective one of the second disc means; and wherein at least one of the plurality of first disc means, the plurality of second disc means and the plurality of intermediate disc means comprises disc means having differing diameters, whereby the movement of the intermediate shaft causes an alteration of a transmission ratio between the first and second shafts.

* * * * *